Dec. 11, 1934.  R. SCHLUMBERGER  1,984,200
CONTROLLING AND GUIDING DEVICE FOR THE FALLER BARS OF GILL BOXES
Filed June 30, 1931  2 Sheets-Sheet 1

R. Schlumberger
INVENTOR

By: Marks & Clerk
Att'ys.

Dec. 11, 1934. R. SCHLUMBERGER 1,984,200
CONTROLLING AND GUIDING DEVICE FOR THE FALLER BARS OF GILL BOXES
Filed June 30, 1931    2 Sheets-Sheet 2
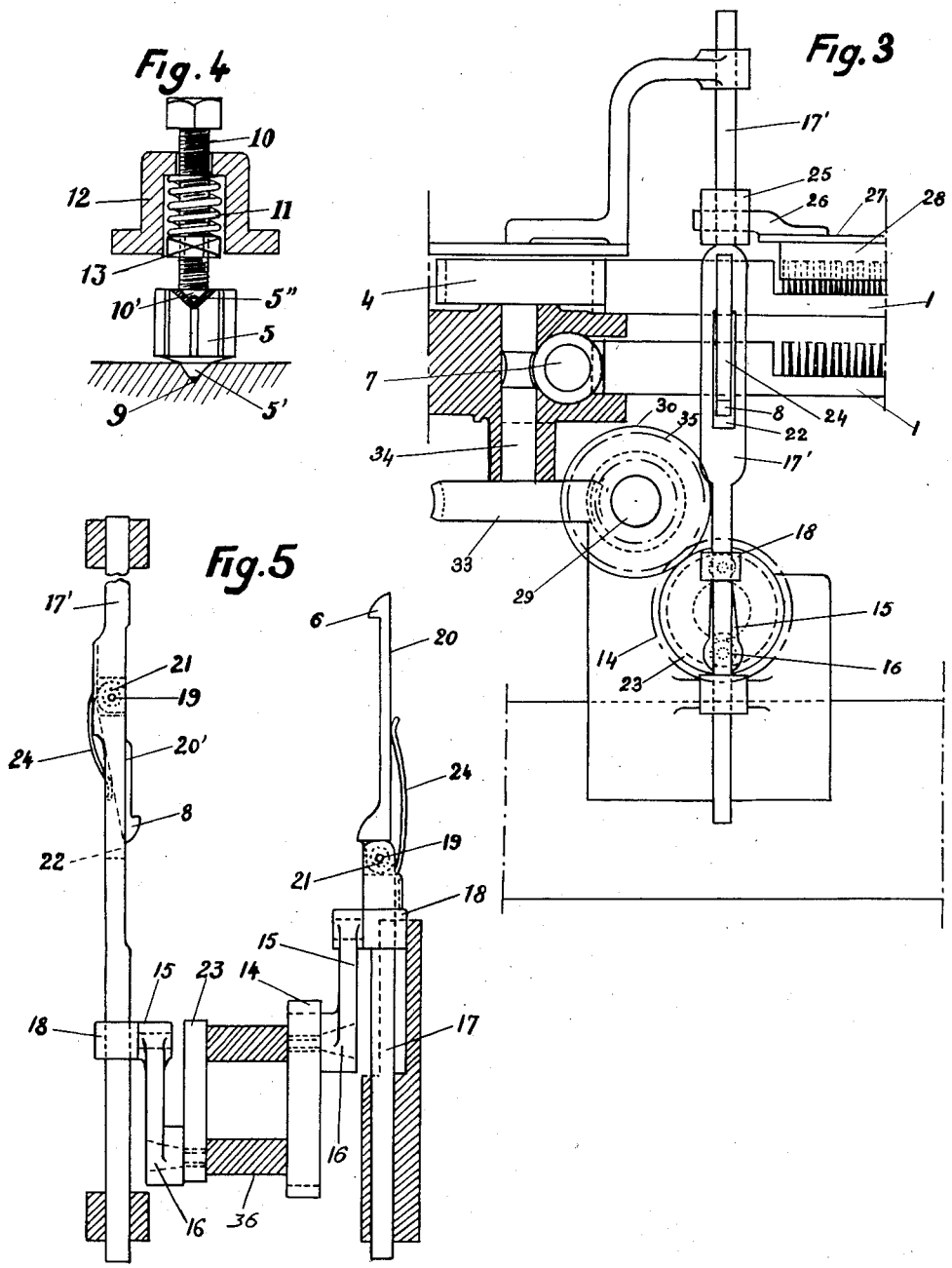
R. Schlumberger
INVENTOR Patented Dec. 11, 1934

1,984,200

UNITED STATES PATENT OFFICE 1,984,200

CONTROLLING AND GUIDING DEVICE FOR THE FALLER BARS OF GILL BOXES

Robert Schlumberger, Guebwiller, France, assignor to Society "Nouvelle Societe de Construction, ci-devant N. Schlumberger & Cie", Guebwiller, France Application June 30, 1931, Serial No. 547,952 In France August 13, 1930

7 Claims. (Cl. 19—129)

The invention relates to gill box drawing mechanisms and intersecting gill box mechanisms of the kind in which the bars are controlled and propelled by means of toothed controlling and propelling wheels engaging with the gear toothed shaped ends of the faller bars.

The principal object of the invention is to obtain a uniform and continuous propulsion of the bars on the table in an assembled group, with the rows of points strictly parallel to each other and held rigidly in a vertical position without adopting any inclination during the whole travel over the table, while at the same time preventing the free advance of the bars over the table.

According to the invention, freely mounted pinions, rotatable against a braking action, are provided on each side of the front part of the table of the drawing mechanism at its outlet end, the teeth of these pinions meshing with the teeth of the terminal bars, the first of which is descending.

According to a further feature of the invention, the length of the teeth of the loose braked pinions, corresponding to the depth of these pinions, is such that when the bar is descending its tooth shaped ends are guided vertically by the teeth of the pinions and are disengaged therefrom only after the points have completely left the sliver, the bar then reaching the lower guide or track in order to be returned by the coarse threaded return screw to the inlet end of the table.

By this means the bars are kept strictly vertical during their descent and disengagement from the slivers.

According to another feature of the invention the length of the teeth of the controlling and propelling wheels, corresponding to the thickness of these wheels, is such that each of the tooth shaped ends of a bar is guided, during the upward return movement of the bar, between the teeth of these wheels and slides vertically therein until it is disengaged by the rotation of the wheels at the moment when the bar reaches the inlet end of the gill table.

In this way the bars are also made to maintain a vertical position when they rise again in order to reenter the table.

According to another feature of the invention rise and fall cams or beaks are provided whereby the bars are raised and lowered, the said cams or beaks being given a vertical reciprocating motion and being acted upon by springs for permitting the cams or beaks to pass over the bars in one direction of movement and engage with them in the other direction of movement.

One embodiment of the invention is hereinafter described and is illustrated diagrammatically in the accompanying drawings, in which:—

Figure 3 is a rear end view.

Figure 4 is a sectional elevation of a brake device for the guiding members.

Figure 5 is a side elevation showing a constructional detail of the rise and fall mechanism of the bars.

Figure 1:
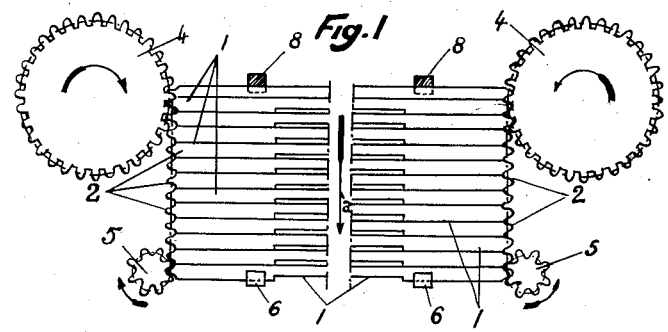
Figure 1 is a top plan view illustrating the constructional principle governing the conception of the mode of control or propulsion of the faller bars and that of guiding the descent of the said bars.
Figure 6:
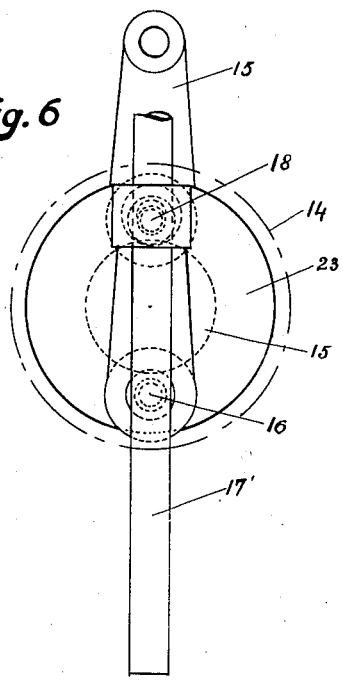
Figure 6 is a partial front elevation of Figure 5.

The controlling or propelling and guiding device for the descent of the bars is constructed essentially as follows:

The ends of the bars 1, made of tempered steel for example, are, in the known manner, cut to the shape of gear teeth 2, so that when the bars are assembled together on the upper guide or track 3 a rack of teeth is formed on each side of the gill box head. The number of bars 1 assembled on the gill box head depends upon the width of the table chosen.

The arrangement formed by these assembled bars is controlled or propelled from back to front in the direction of the arrow $a$ by means of the two toothed wheels 4, made of tempered steel for example. These wheels are driven by vertical shafts placed on each side of the back of the gill box table, and their teeth engage with the corresponding rack formed by the assembled teeth 2 at the ends of the last bars 1 of the series on the guide 3.

At the front of the table and on each side is loosely mounted a toothed pinion 5 which engages with the teeth of the first bars, the first of which is descending. These pinions may for example be made of tempered steel.

The function of these pinions is to keep the whole set of bars moving on the gill box table in a rigid block in which the rows of points are perfectly parallel to each other and vertical, and at the same time to prevent the free advance of the assembly of bars so as to permit it to oppose the necessary resistance to the pull on the slivers due to the drawing action.

These loose pinions 5 which are rotated by the horizontal movement of the bars, are acted upon by a braking action so as to oppose a certain resistance to the advance of the arrangement of faller bars, and this resistance may be varied as desired by regulating the braking action exerted on the said pinions.

The toothed pinions 5 also have the function of ensuring a mathematically correct guiding of the descending bar so that it will remain strictly vertical during its downward movement without adopting any forward or backward inclination. During this descent the needles will be progressively disengaged from the sliver under the action of catches or beaks 6.

These pinions 5, which are rotated uniformly against a braking action by the uniform advance of the propelling bars by the toothed wheels 4, continue to propel uniformly the bar which is about to descend. The toothed ends 2 of this bar are gripped by meshing between two consecutive teeth of each pinion. Under the action of the catches or beaks 6, they slide in an upright position between the teeth of the pinions 5, which serve them as guides, and are so held until they are disengaged at a moment when the points have already left the sliver, the bar reaching then the lower guide or track. From here the bar is returned by the coarse thread return screws 7 towards the entry side of the gill box table, where it is raised by beaks 8 which insert the teeth 2 of the bar into the teeth of the controlling wheels 4 which guide the bar into the material in a perfectly correct manner. The bar in question is placed in contiguity with and at the same level as the series of bars 1 already engaged in the material; it travels forward with these bars under the propulsion of the wheels 4 and recommences a new cycle of operations.

The manner in which the operation of the propelling wheels 4, the braking action on the loose pinions 5, the fall and rise of the bars by means of cams or beaks, is obtained, constitutes the second part of the invention, which is however of secondary importance since, while the means for obtaining the above results assist in the operation of the whole arrangement, they may be varied.

In the example considered, the means adopted are constructed as follows:

In the case of the braking device for the pinions 5 (Figure 4) the lower face of each of these pinions forms a cone frustum 5' which is a frictional fit in a corresponding conical footstep bearing 9; the upper face of each of these pinions carries a conical recess 5'' in which is lodged the pointed end 10' of a clamping screw 10 made of tempered steel. The pressure is obtained by a compression spring 11 placed in a cage support 12 and acting upon a square adjustable nut 13 fitting in the square bore of the cage.

By means of the device and according to the compression of the spring 11, the braking action on the pinions 5 and that offered to the forward motion of the bars 1 may be suited to the effort required by the drawing of the different natures of filaments forming the sliver to be drafted.

With regard to the controlling device for each cam, catch or beak for lowering and lifting the bars (Figures 2, 3, 5 and 6), an inlet wheel 14 rotating continuously acts as a crank and, through a link 15 turning on a conical adjustable journal 16, controls a rise-and-fall rod 17 provided with a pivot 18.

Upon this rod 17 is pivoted at 19 the tail end of the front beak 6 the pivotal connection for this beak 6 being provided with tempered steel bushings 21 in order to prevent wear.

The rods 17' controlling the rear beaks 8 for lifting the bars, operate in an upward direction and comprise a slot 22 in which is lodged the tail 20' of the beak 8 pivoted in the same manner as the front beaks.

The inlet wheel 14 is rigid with a crank plate 23 which, by means of members analogous to 15, 16 and 18 actuates the rise and fall rod 17' controlling the rear pivot beaks 8 which lift the bars. The wheel 14 and crank plate 23 are connected by a hollow axle 36 which is journalled in the bearing 37, as clearly shown in Fig. 2 of the drawings.

The conical journals of the cranks 14 and 23 are placed at an angle of 180° and cause the rods 17, 17' to work in opposite directions, thus providing a perfect balance for the device. The beaks with pivoted ends are held by flat springs 24 in such a way that when the rods 17, 17' are displaced, the beaks yield and open by sliding along the body of the bar 1 which has to be lifted or lowered, and at the end of their travel, which extends a little beyond the bodies, they return into the normal position under the action of the springs, and engage the bars and carry them along in their return movement in order to position them for engagement by either the return screw 7 or by the control wheels 4.

In addition to the devices described above for controlling or propelling the bars, for their guided lowering movement and their upward movement, and for the control of the beaks, a dabbing device is provided for pressing the material into the points or needles. This dabbing device operates to avoid the defective drawing of the fibre which exists in simple gill boxes and is due to the fact the material is not sufficiently embedded or driven into the points, so that parcels of fibres consequently float above the points and give rise to defective drawing.

Figure 2:
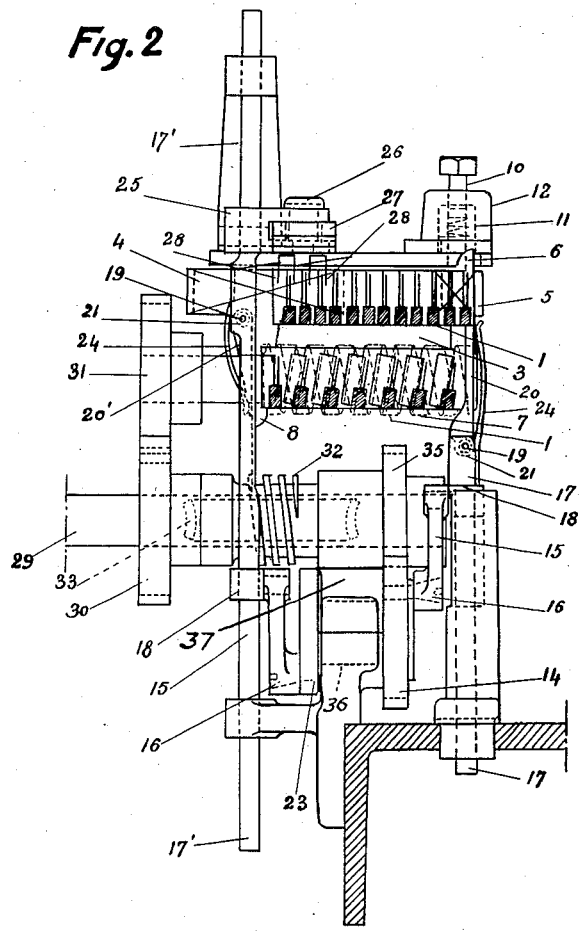
Figure 2 is a side elevation in section of a gill box, the bars of which are propelled and guided by means according to the invention.

One form of construction of such a dabbing device is shown in Figures 2 and 3, and is formed as follows:

The blade holder 27, made of a light metal, is engaged with easy friction between the two rods 17' in supports 25, made of a light metal and fixed upon the back rise-and-fall rods 17'; the blade holder 27 is held in place by pins 26; upon this blade holder are riveted the blades 28 which penetrate between the first rows of needles and follow the synchronous movement of the rise-and-fall rods 17'.

The movement of the device above described is obtained for the whole arrangement by a shaft 29 which drives through a pair of toothed wheels 30 and 31 the screw 7 returning the bar 1. A screw 32 having a simple thread transmits the movement to the controlling wheel 4 of the bars through the medium of a worm wheel 33 keyed on the shaft 34 of the said driving wheel 4.

A wheel 35 keyed on the shaft 29 and meshing with the crank wheel 14 transmits the movement to the rise-and-fall device.

As the pairs of wheels 30—31, 35—14 and 33—4 each have a similar number of teeth, it follows that for one turn of the shaft 29 the bar-returning worm 7 and the crank 14 and 23 will also make one turn while the control wheel 4 of the bars turn through one tooth.

As the movement is synchronous, the operation very smooth and the operation very certain, it will be understood that the whole device thus improved according to the invention may be driven at high speeds; this has hitherto been impossible with existing gill boxes without introducing difficulties.

It is clearly understood that without going outside the scope of the invention changes, improvements and modifications in details may be made and the use of equivalent means envisaged, and that in this way for example the shape of the ends of the bars may, instead of having the form of a tooth, be in the form of a vertical groove in which the teeth of the wheels 4 and the pinions 5 penetrate.

What I claim is:

1. A gill box drawing mechanism comprising a table including upper and lower guide tracks, a plurality of faller bars having teeth at their ends, said bars being movable along the guide tracks, toothed propelling wheels oppositely mounted on the table at the rear end of the upper guide track to engage the opposite toothed ends of the faller bars to move said bars forward on the upper guide track, means for propelling the faller bars rearward on the lower guide track, and opposite pinions mounted on the table at the front end of the upper guide to engage the opposite toothed ends of the faller bars as said bars approach the end of their travel on the upper guide track, said pinions operating to retard the forward movement of the bars on the upper guide track to compact the bars on said track and said pinions also operating to guide the bars from the upper guide track to the lower guide track and to the propelling means for moving the bars rearward on the lower guide track.

2. Mechanism as claimed in claim 1, wherein the length of the teeth of the pinions is such that when a bar is descending the teeth upon the ends thereof are guided by the teeth of the pinions to maintain the bar in an upright position, the teeth of the bars disengaging the teeth of the pinions only after the points have completely left the slivers, whereby the bar reaches the lower track, and feed screws adapted to mesh with the teeth of the bars to return the same to the rear end of the table.

3. Mechanism as claimed in claim 1, wherein the length of the teeth of the propelling wheels which corresponds to the thickness thereof, are such that the teeth of the bar is guided, during the upward return movement thereof between the teeth of the propelling wheels and slide in an upright position therebetween until disengagement thereof at the moment when the bar reaches the rear end of the table.

4. Mechanism as described in claim 1, wherein beaks are provided for raising and lowering the bars, means for imparting vertical reciprocatory movement to the beaks, springs associated with the beaks whereby the beaks are adapted to pass over the bars when moved in one direction and to engage the bars when moved in a reverse direction.

5. Mechanism as described in claim 1 wherein a compression spring is employed for regulating the braking action of the frictionally mounted pinions.

6. Mechanism as claimed in claim 1, wherein beaks are provided, vertically movable rods pivotally connected with the beaks, means for reciprocating the rods, springs for pressing the beaks against the bars to cause engagement thereof with the bars when the rods are moved in one direction and to disengage the bars and pass thereover when the rods are moved in reverse directions.

7. A gill box drawing mechanism comprising a table including upper and lower tracks, a plurality of bars movable relatively to the tracks and having teeth upon their ends, toothed propelling wheels adjacent the rear end of the upper guide track, the teeth thereof being successively engageable with the teeth of the bars to feed the same upon the upper track in assembled relationship, a loosely rotatable pinion upon each side of the forward end of the table, the teeth thereof being successively engageable with the teeth of the bars and serving to successively guide the foremost bar to the lower track, beaks movable vertically at the front and rear ends of the table and engageable with the bars to successively move the same from the upper track to the lower track and from the lower track to the upper track.

ROBERT SCHLUMBERGER.